United States Patent
Schrewe

(10) Patent No.: US 8,394,159 B2
(45) Date of Patent: Mar. 12, 2013

(54) VEHICLE AIR CLEANER HOUSING

(75) Inventor: Laine Alison Schrewe, Dublin, OH (US)

(73) Assignee: Honda Motor Co., Ltd., Tokyo (JP)

( * ) Notice: Subject to any disclaimer, the term of this patent is extended or adjusted under 35 U.S.C. 154(b) by 118 days.

(21) Appl. No.: 13/018,355

(22) Filed: Jan. 31, 2011

(65) Prior Publication Data

US 2012/0192535 A1   Aug. 2, 2012

(51) Int. Cl.
*B01D 46/00* (2006.01)

(52) U.S. Cl. ............. 55/385.3; 55/493; 55/480; 55/495; 55/503; 123/198 E

(58) Field of Classification Search ................. 55/385.3, 55/493, 502, 503, 497, 501, 511, 521, 506; 123/198 E
See application file for complete search history.

(56) References Cited

U.S. PATENT DOCUMENTS

| | | |
|---|---|---|
| 2,117,151 A | 5/1938 | Cowan |
| 4,431,114 A | 2/1984 | Kleinfeld |
| 4,925,469 A | 5/1990 | Clement et al. |
| 5,048,707 A | 9/1991 | Hallberg |
| 5,569,311 A | 10/1996 | Oda et al. |
| 5,605,554 A * | 2/1997 | Kennedy ......................... 55/493 |
| 5,640,937 A * | 6/1997 | Slopsema ................. 123/198 E |
| 5,730,768 A * | 3/1998 | Kaminaga et al. ........... 55/385.3 |
| 6,174,343 B1 | 1/2001 | Bloomer |
| 6,231,630 B1 | 5/2001 | Ernst et al. |
| 6,331,630 B1 * | 12/2001 | Bringmann et al. .......... 546/140 |
| 6,866,694 B2 * | 3/2005 | Moreau et al. ............... 55/385.3 |
| 6,901,632 B2 | 6/2005 | Boyce |
| 7,473,292 B2 | 1/2009 | Moriyama et al. |
| 2002/0148846 A1 | 10/2002 | Luburic |
| 2008/0110146 A1 * | 5/2008 | Germain et al. ............. 55/385.3 |
| 2010/0043367 A1 | 2/2010 | Desjardins |

FOREIGN PATENT DOCUMENTS

JP   52020170   2/1977

* cited by examiner

*Primary Examiner* — Duane Smith
*Assistant Examiner* — Minh-Chau Pham
(74) *Attorney, Agent, or Firm* — Rankin Hill & Clark LLP

(57) ABSTRACT

An air cleaner housing for a vehicle air cleaner element includes a first housing member secured within a vehicle and defining at least one tongue aperture, and a second housing member having a main housing portion and at least one tongue. The first and second housing members together enclosing the air cleaner element. The at least one tongue is pivotally mounted to the main housing portion and removably received in the at least one tongue aperture of the first housing member to pivotally secure the second housing member to the first housing member.

19 Claims, 4 Drawing Sheets

VEHICLE AIR CLEANER HOUSING

BACKGROUND

The present disclosure generally relates to a vehicle air cleaner housing, and more particularly relates to an air cleaner housing having a housing member with a tongue pivotally attached thereto.

A current air cleaner housing, includes a first housing member secured within a vehicle and having at least one tongue aperture, and a second housing member having a main housing portion and at least one tongue that is removably received in the at least one tongue aperture to form a hinge element allowing the second housing member to pivot relative to the first housing member. Such pivoting may be desirable when replacing an air filter element disposed within the air cleaner housing without the necessity of fully removing the second housing member from the first housing member.

One problem with this arrangement is that each tongue is integrally formed with the second housing member and not movable relative thereto. For example, the tongue can be a solid projection extending from a wall of the second housing member. When inserting the tongue in its corresponding tongue aperture, the tongue can sometimes become wedged between the air cleaner element and the structure of the first housing member defining the tongue aperture. This can occur when the air filter element has a height that is higher or elevated relative to a sealing surface of the first housing member. As a result, the tongue can have a "sticking region" where it is difficult to insert into the tongue aperture. This can create a difficult situation for the customer during air cleaner maintenance (e.g., air cleaner element replacement). If the tongue is not fully inserted into the tongue aperture, it can be easily broken or damaged leading to customer dissatisfaction.

SUMMARY

According to one aspect, an air cleaner housing for a vehicle air cleaner element includes a first housing member secured within a vehicle and defining at least one tongue aperture, and a second housing member having a main housing portion and at least one tongue. The at least one tongue is pivotally mounted to the main housing portion and removably received in the at least one tongue aperture of the first housing member to pivotally secure the second housing member to the first housing member. The first and second housing members enclose the air cleaner element.

According to another aspect, a vehicle air cleaner housing includes a housing member for covering an air cleaner element. The housing member has a first end and a second end. The vehicle air cleaner housing further includes a tongue extending generally orthogonally from a wall of the housing member that is disposed at the first end of the housing member. The tongue is receivable in a corresponding tongue aperture. The tongue is pivotally attached to the wall to facilitate insertion of the tongue into the corresponding tongue aperture.

According to a further aspect, a hinge for an air cleaner housing in a vehicle includes a tongue extending from a first housing member and a tongue aperture disposed on a second housing member. The tongue is receivable in the tongue aperture to hingedly connect the first housing member to the second housing member. A hinge connection pivotally connects the tongue to the first housing member.

DETAILED DESCRIPTION

Figure 1:
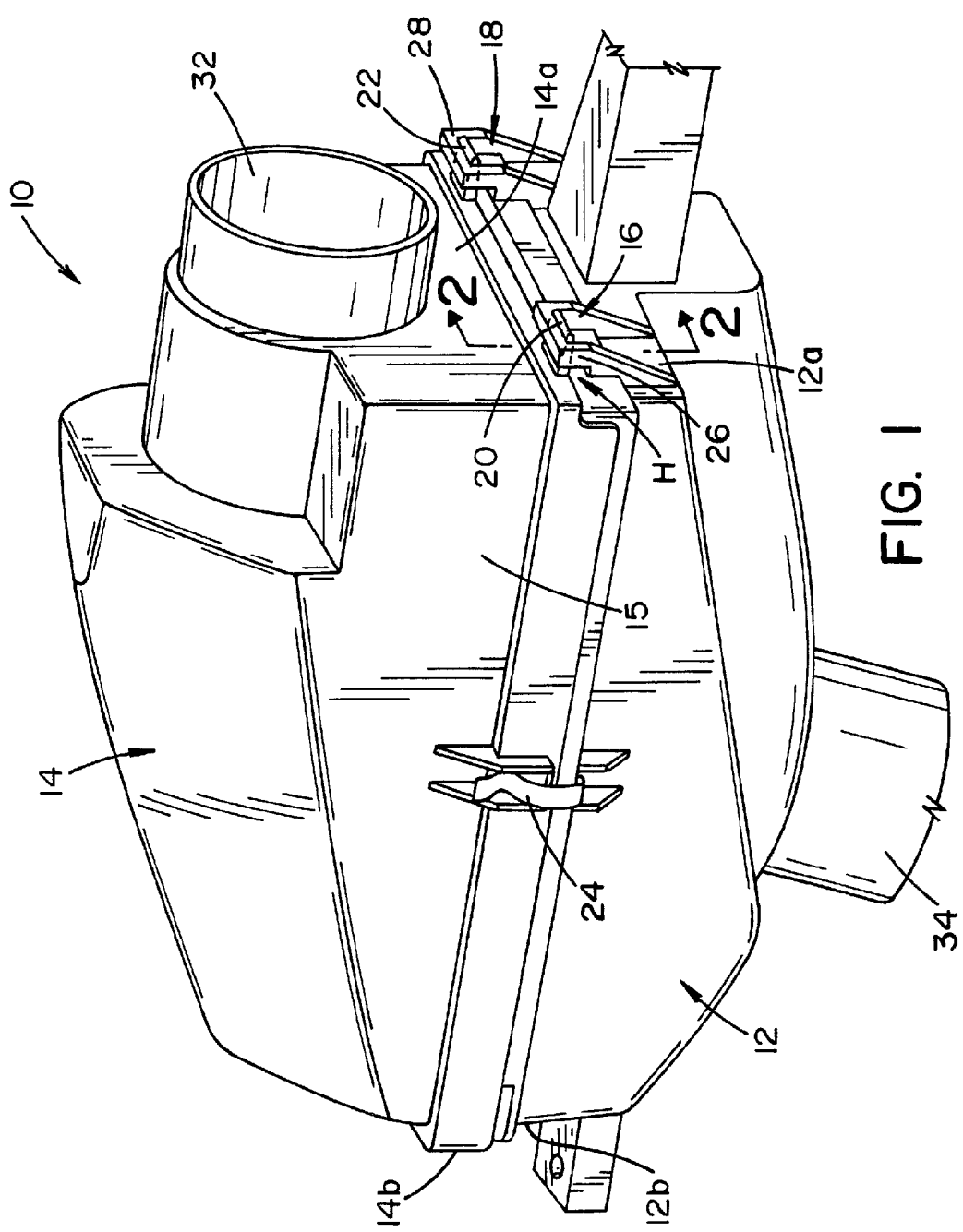
FIG. 1 is a perspective view of an air cleaner housing for a vehicle air cleaner element having a first lower housing member and a second upper housing member.

Referring now to the drawings wherein the showings are for purposes of illustrating one or more exemplary embodiments and not for purposes of limiting same, FIG. 1 illustrates a known vehicle air cleaner housing generally indicated by reference 10. The known air cleaner housing 10 includes a first lower housing member 12 and a second upper housing member 14. The first housing member 12 is secured within a vehicle and defines at least one tongue aperture. The second housing member 14 includes a main housing portion 15 and at least one tongue extending from the main housing portion 14a. The at least one tongue of the second housing member 14 is removably received in the at least one tongue aperture of the first housing member 12 for defining a hinge H between the first and second housing members 12, 14.

More particularly, in the housing 10 illustrated in FIG. 1, the at least one tongue aperture is a pair of laterally spaced apart tongue apertures 16, 18 and the at least one tongue is a pair of laterally spaced apart tongues 20, 22. The tongues 20, 22 are removably received in respective ones of the tongue apertures 16, 18 of the first housing member 12 thereby defining the hinge H between the first and second housing members 12, 14. In addition, at least one locking device 24 is provided for selectively locking or clamping the second housing member 14 to the first housing member 12 and securing the housing members 12, 14 together when the tongues 20, 22 are received in the apertures 16, 18.

More specifically, the tongue apertures 16, 18 are defined by structural portions 26, 28 of the first housing member 12. Accordingly, the structural portions 26, 28 defining the tongue apertures 16, 18 and the tongues 20, 22 received therein together form the hinge H that allows pivotal movement of the second housing member 14 relative to the first housing member 12. Though this hinged connection, when the spring clips 24 are disengaged, the second housing member 14 is movable between a first, closed position wherein the first and second housing members 12, 14 enclose and cover an air cleaner element 30 (FIG. 2) and a second, pivoted open position wherein the second housing member 14 is pivoted open at the hinge H to provide access to the air cleaner element 30. Such access would be desirable, for example, when replacing the air filter element 30 disposed inside the air cleaner housing.

As shown, the at least one tongue 20, 22 is disposed at one end (e.g., a first end 14a) of the second housing member 14 and the at least one tongue aperture 16, 18 is disposed at one corresponding end (e.g., a first end 12a) of the first housing member 12. The at least one locking device 24 can be disposed in spaced relation relative to the ends 12a, 14a of the first and second housing members 12, 14 (i.e., toward second ends 12b, 14b of the housing members 12, 14). The at least one locking device 24 can selectively lock the second housing member 14 in the closed position on the first housing member 12 to thereby prevent pivoting movement of the second housing member 14 about the hinge H and seal the air cleaner element 30 within the housing 10. In the illustrated embodiment, the at least one locking device 24 is at least one spring clip (e.g., two spring clips disposed on either lateral side of the housing 10) that latches the first and second housing members 12, 14 together in a manner known and understood by those skilled in the art.

In the illustrated embodiment, the first housing member 12 can include an intake port 34 for receiving incoming engine airflow, such as delivered through an upstream bulkhead cover intake port, for example. The second housing member 14 can include an outlet port 32 for delivering air flow filtered by the air cleaner housing 10, and particularly by the air cleaner element 30 housed therein, to an engine intake of the vehicle. Together the first and second housing members 12, 14 can enclose the air cleaner element 30 for purposes of filtering air admitted through the inlet port 34 before being delivered by the outlet port 32 to the engine intake. Between the port 34 and the air filter element 30, which is on an upstream side of the air cleaner element 30, the first housing 12 defines an incoming chamber. Between the port 32 and the air filter element 30, which is on a downstream side of the air cleaner element 30, the second housing 14 defines an exit chamber.

Figure 2:
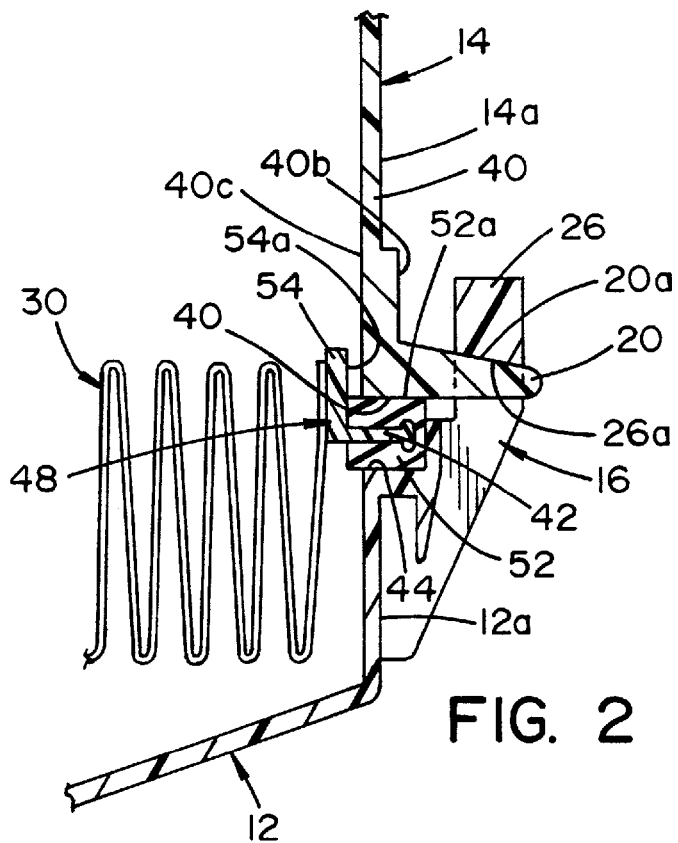
FIG. 2 is a cross-sectional view of the air cleaner housing and air cleaner element taken along the line 2-2 of FIG. 1.

With additional reference to FIG. 2, the tongue 20 is shown received in the aperture 16 defined by the structural portion 26 of the first housing member 12. As shown, the second housing member 14, and particularly the main housing portion 15 thereof, includes a wall 40 that is generally vertically oriented in the illustrated embodiment. The tongue 20 extends from the wall 40 and is oriented approximately perpendicular relative to the wall 40 (i.e., the direction in which the tongue 20 extends is generally perpendicular to the wall 40). More specifically, the tongue 20 extends generally orthogonally from the wall 40 of the housing member 14, the wall 40 disposed at the first end 14a of the second housing member 14.

When assembled (i.e., when the second housing member 14 is secured in a closed position on the first housing member 12), a mounting portion or flange 42 of the air cleaner element 30 is captured between a distal end 40a of the wall 40 and a shoulder 44 of the first housing member 12. In the illustrated embodiment, the mounting flange 42 is a portion of a frame 48 to which the filter element 30 is secured. A seal, such as the depicted U-shaped seal 52, can be received over the flange 42 for sealing to the first and second housing members 12, 14. As shown, the engagement between the tongue 20 and the structural portion 26 of the first housing member 12 captures the mounting flange 42 and the seal 52 between the distal end 40a and the shoulder 44 thereby securing and sealing the air filter element 30 within the air cleaner housing 10. In particular, the distal end 40a contacts or engages an upper surface 52a of the seal 52 As illustrated, an exterior surface 20a abuts or is adjacent surface 26a of the structural portion 26 of the first housing member 12 defining the aperture 16 and a second, opposite surface 40c abuts or is adjacent a parallel wall surface 54a of frame wall 54, which itself protrudes upward from the mounting flange 42.

Figure 3:
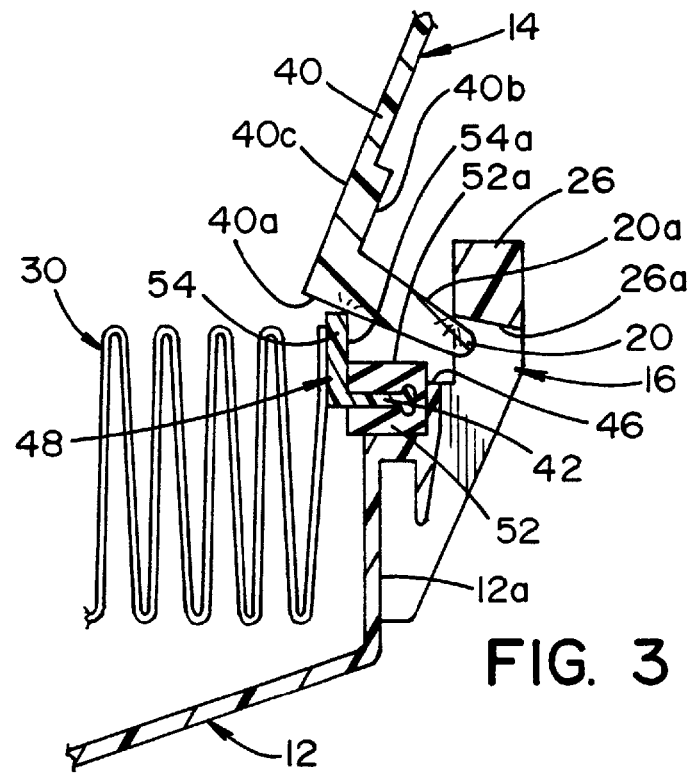
FIG. 3 is a cross-sectional view similar to FIG. 3, but showing a tongue of the second housing member becoming stuck as the tongue is inserted into a tongue aperture of the first housing member.

As shown, the tongue 20 can be integrally formed with the wall 40, and more generally with the second housing member 14. As a result, with further reference to FIG. 3, the tongue 20 can become stuck between the air cleaner element 30 and the structural portion 26 of the first housing member 12. The likelihood of this occurring increases when a vertical height of the frame wall 54 is increased and/or the sealing surface 52a of the seal is higher than a sealing surface 46 of the first housing member 12. This might result, for example, when a replacement air filter element 30 is used in the air cleaner housing 10 that is slightly different from the original OEM specifications. In any case, such a disparity in height can result in a "sticking region" where it is difficult to insert the tongue 20 into the tongue aperture 16. This can create a difficult situation for the customer during air cleaner maintenance, such as when the air filter element 30 is being replaced. Also, if the tongue is not fully inserted in the tongue aperture 16, it can become easily broken or damaged resulting in customer dissatisfaction.

Figure 4:
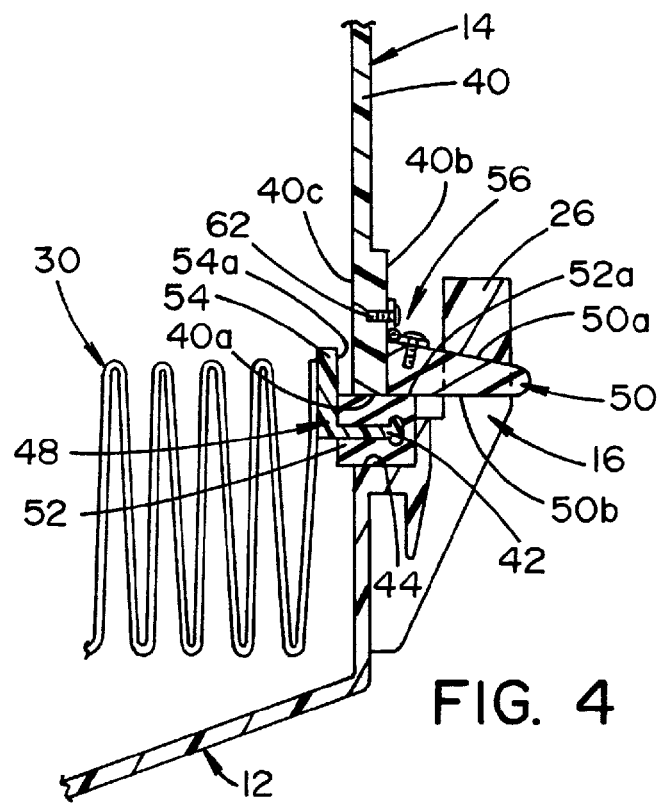
FIG. 4 is a cross-sectional view of an air cleaner housing according to an exemplary embodiment wherein a tongue of a housing member is pivotally attached to a wall of the housing member.
Figure 5:
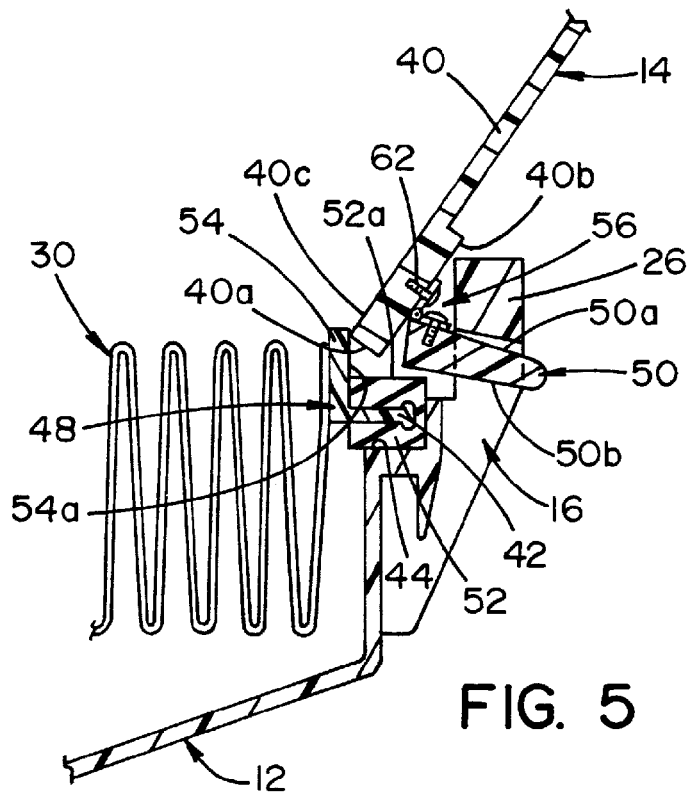
FIG. 5 is a cross-sectional view similar to FIG. 4 but showing the pivotal connection between the tongue and a wall of the housing member allowing the tongue to be easily received within a tongue aperture of another housing member.
Figure 6:
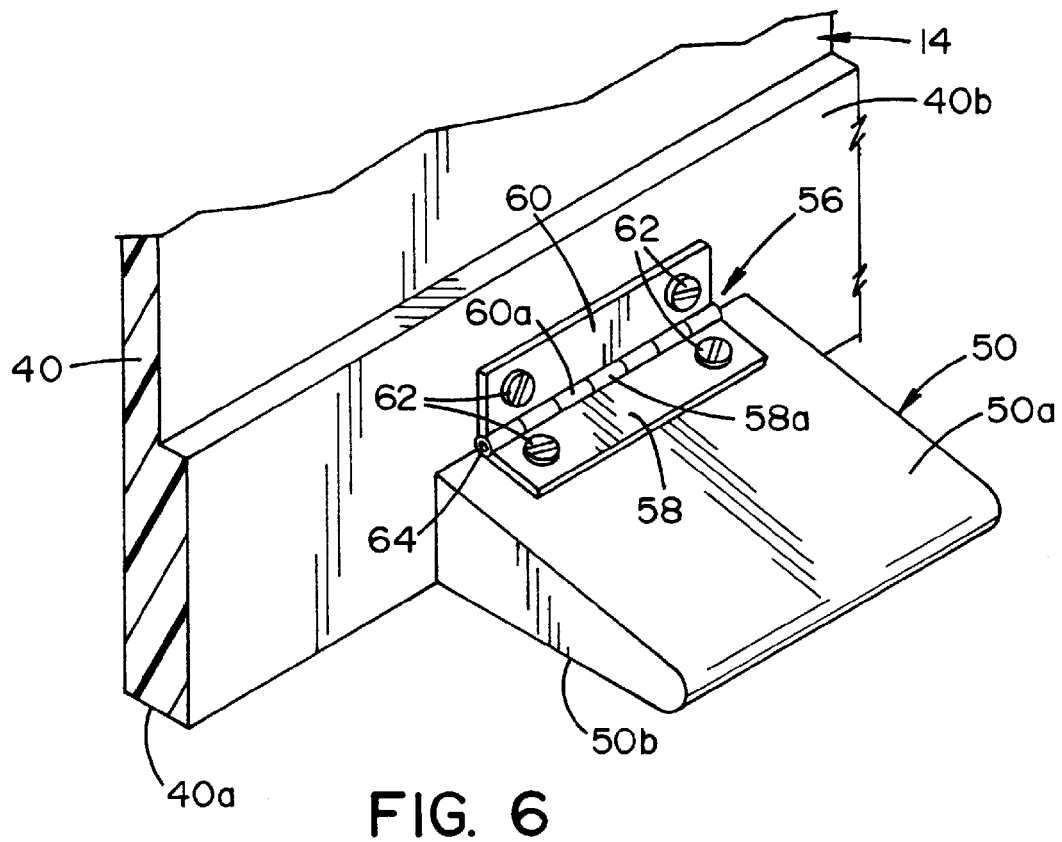
FIG. 6 is a partial perspective view of the tongue pivotally mounted to the wall of the housing member.

Addressing this concern, FIGS. 4-6 illustrate an improved hinge for the air cleaner housing 10 wherein each at least one tongue (e.g., tongues 20, 22) is replaced by tongue 50, which can be pivotally mounted to the main housing portion 15. More specifically, the tongue 50 can be pivotally attached to the wall 40 to facilitate insertion of the tongue 50 into the corresponding tongue aperture 16 as will be described in more detail below. In the embodiment illustrated in FIGS. 4-6, a hinge connection 56 pivotally connects the tongue 50 to the housing member 14. Like the tongue 20, the tongue 50 can be oriented so as to extend from the first housing member 14 in a direction generally orthogonal to wall 40. The tongue 50 is removably receivable in the tongue aperture 16 to hingedly connect the housing member 14 to the housing member 12. By this arrangement, the housing member 14, which covers the air cleaner element 30, includes the tongue 50 extending generally orthogonal from the wall 40 of the housing member 14

More particularly, in the embodiment illustrated in FIGS. 4-6, an upper side 50a of the tongue 50 is pivotally connected by the hinge connection 56 to exterior surface 40b of the wall 40 of the housing member 14. As shown, the tongue 50 generally protrudes from the exterior surface 40b and the distal end or end edge 40a of the wall 40 is generally parallel to a direction in which the tongue 50 protrudes. In the illustrated embodiment, the tongue 50 has an underside surface 50b which is contiguous with the distal end edge 40a when the tongue 50 is unpivoted relative to the wall 40 and the upper surface 50a is an opposite side surface relative to the underside surface 50b. The tongue 50 can be pivotally connected to the wall 40 at about an intersection between the surface 50a and the exterior surface 40b of the wall 40. As shown, the mounting flange 42 of the air cleaner element 30 is captured between distal end 40a of the wall 40 and shoulder 44 of the first housing member 12, particularly when the second housing member 14 is secured in a closed position on the first housing member 12.

In the illustrated embodiment, the hinge connection can be formed or can result from a hinge member 56 that includes a first overlay portion 58 overlaying and secured to the upper surface 50a of the tongue 50 and a second overlay portion 60 overlaying and secured to the first exterior surface 40b of the wall 40. The overlay portions 58, 60 can be secured to the respective surfaces 40b, 50a through any known connection element, such as the illustrated screws 62 for example. Other examples include adhesive, others types of fasteners, etc. The portions 58, 60 can include conventional hinge portions 58a, 60a interlaced with one another and adapted to receive a hinge pin 64 as is known and understood by those skilled in the art. It is to be appreciated that the hinge connection can be alternately formed and the illustrated hinge member 56 is merely one example.

The hinged connection between the tongue 50 and the wall 40, and more generally the second housing member 14, allows the tongue 50 to bend about a specified pivot point. As shown in FIG. 5, this allows the hinge to maneuver between the structural portion 26 of the first housing member 12 and the filter element 30, particularly around the frame wall 54 and the upper surface 52a of the seal 52. This eliminates or reduces the likelihood of the tongue becoming wedged and/or stuck when attempting to insert in the tongue aperture 16 of the first housing member 12 thereby reducing the likelihood of the tongue becoming broken or otherwise damaged.

Figure 7:
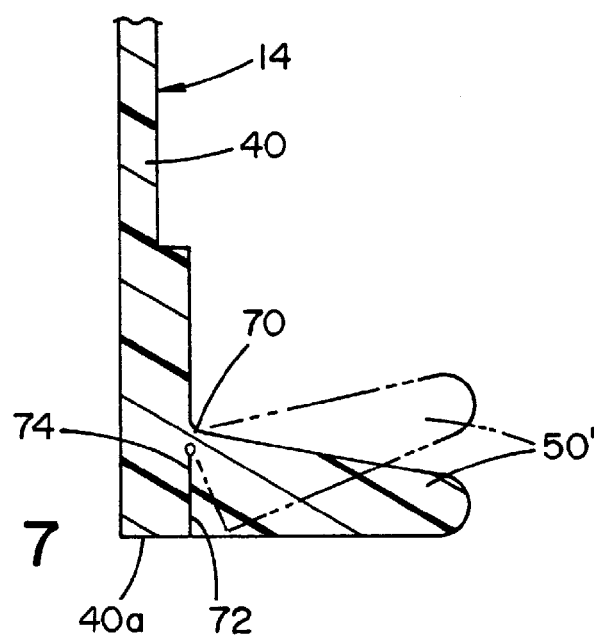
FIG. 7 is a cross-sectional view of a tongue pivotally connected to a wall of a housing member according to another exemplary embodiment.

With reference to FIG. 7, a hinge connection between a tongue 50' and wall 40 is illustrated to according to an alternate exemplary embodiment. In this arrangement, the hinge member 56 is replaced by a molded hinge element 70, which is integrally formed with the wall 40 (and the main housing portion 15) and the tongue 50' and interposed between these elements. The hinge element 70 can be created, for example, by cutting or otherwise producing a slit 72 between a rear side 74 of the pivoting tongue 50' and the wall 40 adjacent the distal end 40a of the wall 40. The hinge element 70 otherwise functions similar to the hinge connection 56 of the embodiment of FIGS. 4-6.

It will be appreciated that various of the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. An air cleaner housing for a vehicle air cleaner element, comprising:
   a first lower housing member secured within a vehicle, the first lower housing member having an upper end portion and defining at least one tongue aperture; and
   a second upper housing member having a main housing portion including a lower end portion and at least one tongue, said at least one tongue pivotally mounted to said main housing portion and removably received in said at least one tongue aperture of the first housing member for defining a hinge between the first and second housing members,
   wherein the second upper housing is movable between a first, closed position to enclose the air cleaner element and a second, pivoted open position to provide access to the air cleaner element, wherein in the closed position the upper end portion and the lower end portion face each other and engage a peripheral portion of the air cleaner element.

2. The air cleaner housing of claim 1 wherein said at least one tongue is disposed at one end of said second housing member and said at least one tongue aperture is disposed at one corresponding end of the first housing member, said at least one tongue and said at least one aperture together forming a hinge allowing said second housing member to pivot relative to the first housing member for providing access to the air cleaner element.

3. The air cleaner housing of claim 2 further including at least one locking device disposed in spaced relation relative to said ends of said first and second housing member, said at least one locking device selectively locking said second housing member in a closed position on said first housing member.

4. The air cleaner housing of claim 3 wherein said at least one locking device is at least one spring clip that latches said first and second housing members together.

5. The air cleaner housing of claim 2 wherein said at least one tongue includes a pair of spaced apart tongues and said at least one tongue aperture includes a pair of spaced apart apertures.

6. The air cleaner housing of claim 1 wherein said main housing member includes a wall and said at least one tongue extends from said wall and is oriented approximately perpendicular relative to said wall.

7. The air cleaner housing of claim 6 wherein a mounting flange of the air cleaner element is captured between a distal end of said wall and a shoulder of said first housing member when the second housing member is secured in a closed position on said first housing member.

8. The air cleaner housing of claim 7 wherein an exterior surface of said wall is abuts or is adjacent a structural portion of said first housing member defining said at least one tongue aperture and a second, opposite surface of said wall abuts or is adjacent a parallel wall surface of the air cleaner element extending from said mounting flange.

9. The air cleaner housing of claim 6 wherein said wall includes an exterior surface from which said at least one tongue protrudes and a distal end edge generally parallel to a direction in which said at least one tongue protrudes, said at least one tongue having a side surface contiguous with said distal end edge of said wall and having an opposite side surface, said at least one tongue pivotally connected to said wall at about an intersection between said opposite side surface of said at least one tongue and said first exterior surface of said wall.

10. The air cleaner housing of claim 9 further including a hinge member including a first overlay portion overlaying and secured to said opposite side surface and a second overlay portion overlaying and secured to said first exterior surface.

11. The air cleaner housing of claim 1 wherein the at least one tongue and the main housing portion are integrally formed with a hinge element integrally formed and interposed therebetween.

12. A vehicle air cleaner housing, comprising:
   a housing member for covering one of an upstream side or downstream side of an air cleaner element, the housing member having a first end and a second end;
   a tongue extending generally orthogonally from a wall of the housing member that is disposed at said first end of the housing member, the tongue receivable in a corresponding tongue aperture, said tongue pivotally attached to said wall by a hinge to facilitate insertion of said tongue into said corresponding tongue aperture.

13. The vehicle air cleaner housing of claim 12 wherein said housing member defines an inlet port for incoming engine airflow.

14. The vehicle air cleaner housing of claim 13 wherein said housing member defines an incoming chamber therein on the upstream side of the air cleaner element.

15. The vehicle air cleaner housing of claim 12 wherein said tongue received in said corresponding tongue aperture forms the hinge allowing said housing member to pivot open.

16. The vehicle air cleaner housing of claim 12 wherein said tongue has an upper surface that is pivotally connected by the hinge to an exterior surface of said wall.

17. The vehicle air cleaner housing of claim 12 further including:

a spring clip disposed on said housing member at a location spaced apart from said first end toward said second end.

18. An air cleaner housing for a vehicle, comprising:
a lower housing member having an upper end portion and a sidewall;
an upper housing member including a lower end portion and a sidewall, the upper housing being movable between a first, closed position to enclose an air cleaner element and a second, pivoted open position to provide access to the air cleaner element;
a tongue extending from the sidewall of one of the upper housing member and lower housing member and pivotally connected thereto via a hinge connection; and
a tongue aperture disposed on the sidewall of the other of the upper housing member and lower housing member, the tongue receivable in the tongue aperture to hingedly connect the upper housing member to the lower housing member.

19. The air cleaner housing of claim 18 wherein an upper side of said tongue is pivotally connected by the hinge connection to an exterior surface of the sidewall of the one housing member.

* * * * *